United States Patent
Chen et al.

(10) Patent No.: US 9,300,944 B2
(45) Date of Patent: Mar. 29, 2016

(54) METHODS AND SYSTEMS FOR PROCESSING 3D VIDEO DATA

(71) Applicant: Amlogic Co., Ltd., Santa Clara, CA (US)

(72) Inventors: Xuyun Chen, San Jose, CA (US); Wei Zhuang, Shanghai (CN); Dongjian Wang, San Jose, CA (US)

(73) Assignee: Amlogic Co., Ltd., Santa Clara, CA (US)

( * ) Notice: Subject to any disclaimer, the term of this patent is extended or adjusted under 35 U.S.C. 154(b) by 259 days.

(21) Appl. No.: 14/046,797

(22) Filed: Oct. 4, 2013

(65) Prior Publication Data

US 2015/0097926 A1   Apr. 9, 2015

(51) Int. Cl.
| | |
|---|---|
| H04N 13/00 | (2006.01) |
| H04N 15/00 | (2006.01) |
| H04N 13/02 | (2006.01) |
| H04N 5/89 | (2006.01) |
| H04N 13/04 | (2006.01) |
| H04N 9/80 | (2006.01) |
| H04N 5/92 | (2006.01) |
| H04N 5/84 | (2006.01) |

(52) U.S. Cl.
CPC ....... H04N 13/0048 (2013.01); H04N 13/0029 (2013.01)

(58) Field of Classification Search
USPC .......... 348/42, 43, 44, 46, 51; 386/239, 241, 386/326, 335
See application file for complete search history.

(56) References Cited

U.S. PATENT DOCUMENTS

| | | | |
|---|---|---|---|
| 2005/0008251 A1* | 1/2005 | Chiang | 382/266 |
| 2015/0062295 A1* | 3/2015 | Yoneda et al. | 348/43 |

OTHER PUBLICATIONS

"A New Stereo Packing Format Based on Checkerboard Sub-Sampling for Efficient Stereo Video Coding", Jul. 12, 2012, Chiang et al, National Cheng Kung University, Taiwan.*

* cited by examiner

*Primary Examiner* — Daquan Zhao
(74) *Attorney, Agent, or Firm* — Venture Pacific Law, PC

(57) ABSTRACT

A method for processing video data, comprises the steps of: decoding a stream of the video data; post-processing the decoded stream as a function of a video data packing format, wherein the decoded stream having first view pixels and second view pixels and wherein the first view pixels and the second view pixels are stored in line buffers according to the video data packing format; and outputting the post-processed stream to a display, wherein the line buffers output the first view pixels and the second view pixels to the display in a displayable format.

9 Claims, 6 Drawing Sheets

METHODS AND SYSTEMS FOR PROCESSING 3D VIDEO DATA

FIELD OF INVENTION

This invention generally relates to video processing, and, in particular, to methods and systems for post-processing of 3D video data.

BACKGROUND

Three-dimensional television ("3D TV") and other 3D displays deliver multiple-views to a viewer to provide a 3D video or image. In particular, 3D televisions and displays display two views, one for the left eye and one for the right eye. Many different standards for compression and distribution are used for providing these multiple views to 3D TV's and 3D displays. For instance, MPEG (Moving Picture Experts Group) standards specify a bit stream syntax and processes that are often used to decode streams corresponding to the multiple views. Other proprietary methods are known in the art for handling the transport and display of multiple views as well.

Decoders and post-processors of these multiple views generally treat each of the multiple views independently from the other view during decoding and post-processing. Post-processing is an important element in order to display the 3D video data since it can increase sharpness, reduce noise, scalar, and so forth. In particular, in digital video, graphics transmission, and/or processing (e.g., compression), noise may occur that may generate incorrect pixels. This noise may distort a video image and may interfere with viewing of the video image content. Noise may also create issues with regard to processing of video data. In some cases, random noise may be introduced during transmission of the video data from one device to another. White noise may be generally characterized as a Gaussian distribution in spatial and/or temporal domains, other types of analog noises in the video signals may not be easily estimated.

In various instances, noise may comprise an artifact of image processing, for example, an artifact of image compression. For example, MPEG compression may be lossy and, in some instances, it may distort the video content. In this regard, the more the video is compressed, that is, the higher the compression ratio, the less the reconstructed video resembles the original information. Some examples of MPEG video distortion are a loss of texture, detail, and/or edges. MPEG compression may also result in ringing on sharper edges and/or discontinuities on block edges. Because MPEG compression techniques are based on defining blocks of video image samples for processing, MPEG compression may also result in visible "macroblocking" that may result due to bit errors. When MPEG video compression results in loss of detail in the video image it is said to "blur" the video image. When MPEG video compression results in added distortion on the video image it is said to produce "artifacts" on the video image. Ultimately, the displayed video image can be blurred and riddled with artifacts.

FIG. 1 illustrates a prior art block diagram for processing 3D video data. A bit stream of 3D video data can be decoded to generate left view pixels and right view pixels of the 3D video data for display. The generated left view pixels and the right view pixels are stored in a memory 10 of the respective system. For post-processing, the left view pixels and the right view pixels are separately processed. A post-processing block 12 can retrieve the left view pixels and post-process those pixels for enhancement, including noise reduction, sharpness enhancement, peak reduction, artifacts reduction, and other post-processing. A post processing block 14 can retrieve the right view pixels and post-process those pixels for enhancement.

The post-processing block 12 outputs the post-processed left view pixels to the memory 10 for storage, and the post processing block 14 outputs the post-processed right view pixels to the memory 10 for storage. Thus, the left view pixels and the right view pixels are independently post-processed for enhancements. From the memory 10, the post-processed left view pixels and the right view pixels are outputted to a reformatting block 18. The reformatting block 18 arranges the post-processed left view pixels and the right view pixels for output to the display.

Thus, the post-processing hardware (e.g., line buffers) is duplicated for each of the views. For instance, one set of the hardware can be used to decode and post-process the left view and another set of the hardware can be used to decode and post-process the right view. Drawbacks of such approach include duplication of hardware and wasted chip area to provide for the duplicated hardware. Therefore, it would be desirable to provide new systems and methods for 3D video data post-processing using shared line buffers.

SUMMARY OF INVENTION

An object of this invention is to provide methods and systems for processing 3D video data to reduce noise, enhance sharpness (e.g., peaking), scalar or color enhancements (e.g., chroma transition improvements), and reduce other unwanted artifacts of pixels of the 3D video data.

Another object of this invention is to provide methods and systems for processing multiple views of 3D video data using shared line buffers to store pixels of the multiple views of the 3D video data.

Yet another object of this invention is to provide low cost methods and systems for post-processing multiple views of 3D video data.

Briefly, the present invention discloses methods and systems for processing video data, comprising the steps of: decoding a stream of the video data; post-processing the decoded stream as a function of a video data packing format, wherein the decoded stream having first view pixels and second view pixels and wherein the first view pixels and the second view pixels are stored in line buffers according to the video data packing format; and outputting the post-processed stream to a display, wherein the line buffers output the first view pixels and the second view pixels to the display in a displayable format.

An advantage of this invention is that methods and systems for processing 3D video data are provided to reduce noise, enhance sharpness (e.g., peaking), scalar or color enhancements (e.g., chroma transition improvements), and reduce other unwanted artifacts of pixels of the 3D video data.

Another advantage of this invention is that methods and systems for processing multiple views of 3D video data are provided using shared line buffers to store pixels of the multiple views of the 3D video data.

Yet another advantage of this invention is that low cost methods and systems for post-processing multiple views of 3D video data are provided.

DESCRIPTION OF THE DRAWINGS

The foregoing and other objects, aspects, and advantages of the invention can be better understood from the following detailed description of the preferred embodiment of the invention when taken in conjunction with the accompanying drawings.

DETAILED DESCRIPTION OF THE PREFERRED EMBODIMENTS

In the following detailed description of the embodiments, reference is made to the accompanying drawings, which form a part hereof, and in which is shown by way of illustration of specific embodiments in which the present invention may be practiced.

Figure 1:
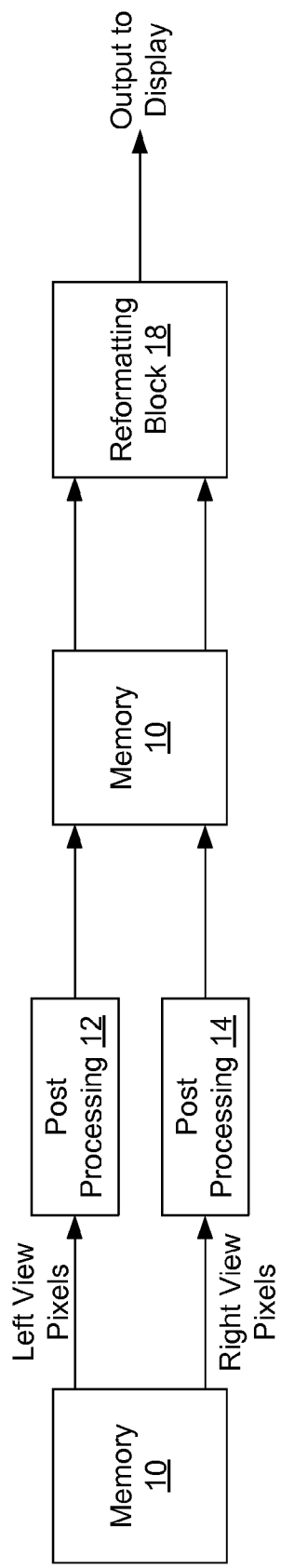
FIG. 1 illustrates a prior art block diagram for processing 3D video data.
Figure 2:
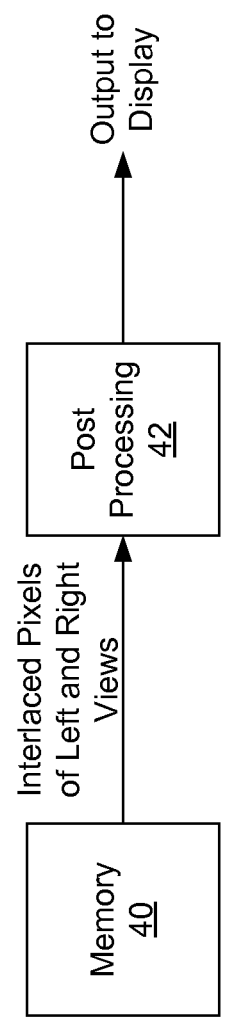
FIG. 2 illustrates a block diagram of the present invention for processing of 3D video data.

FIG. 2 illustrates a block diagram of the present invention for processing of 3D video data. After 3D video data is decoded, decoded left view pixels and decoded right view pixels of the 3D video data can be written to a memory 40 (not shown). The 3D video data can be retrieved from the memory 40 with the left view pixels and the right view pixels of the 3D video data. The retrieved left view pixels and the right view pixels can be stored in line buffers of the post-processing block 42 for post-processing. The post-processed pixels can be outputted to the display in a displayable format since the post-processing block 42 processes the right view pixels and the left view pixels in such format.

However, if the format of pixels in the post-processing block 42 does not match the displayed format, then an additional 3D video data demultiplexer (not shown) can receive the post-processed left view pixels and the right view pixels for output to the display using the display format of the display.

Figure 3:
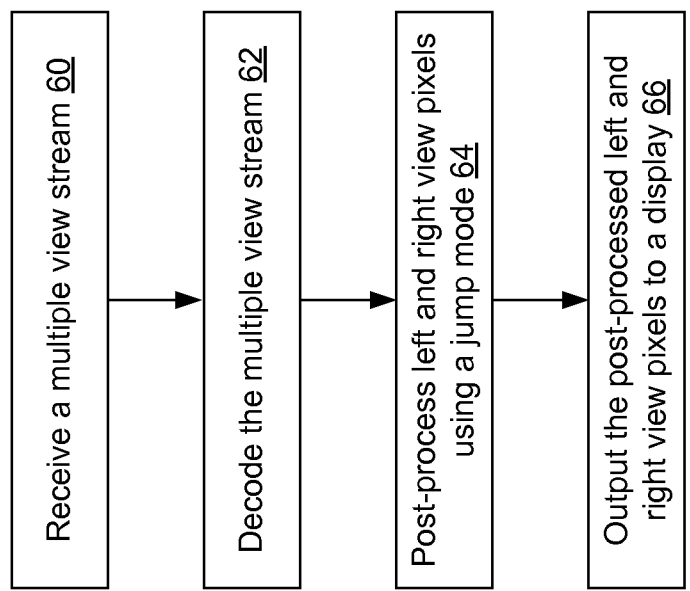
FIG. 3 illustrates a flow chart of the present invention for processing 3D video data.

FIG. 3 illustrates a flow chart of the present invention for processing 3D video data. A 3D video data can be transmitted in a multiple view stream. Thus, a receiver can receive the multiple view stream of the 3D video data 60. The multiple view stream can then be decoded 62 to generate an interlaced right view pixels and left view pixels of the 3D video data. The generated left view pixels and the right view pixels can be post-processed in such interlaced format using a jump mode 64.

The interlaced right view pixels and the left view pixels can be received into line buffers of a post-processor of the present invention (now shown). The post-processor can perform enhancements to the left view pixels and the right view pixels. The left view pixels and the right view pixels can be both stored in the line buffers and processed together. For instance, the left view pixels can be processed first from the line buffers, momentarily ignoring the right view pixels. Once the left view pixels are processed, the right view pixels can be processed next in the line buffers, thereby ignoring the left view pixels. In this manner, the line buffers of the post processor can be operated in a jump mode for post processing, meaning that certain rows and/or certain columns cane be specifically selected for applying post-processing methods for 3D video data enhancements on either the left view pixels or the right view pixels. This also means that the certain rows and/or certain column for the pixels not currently being post-processed are temporarily skipped, until it's that certain rows and/or certain columns turn for post-processing. An alternative implementation can be to replace another view's pixel with the current processing view's nearby pixels by either interpolation or duplication.

Since the left view pixels and right view pixels can be stored in the post-processor in the format to be outputted to a display. The finished, post-processed left view pixels and the right view pixels are outputted to a display 66 for viewing.

Figure 4:
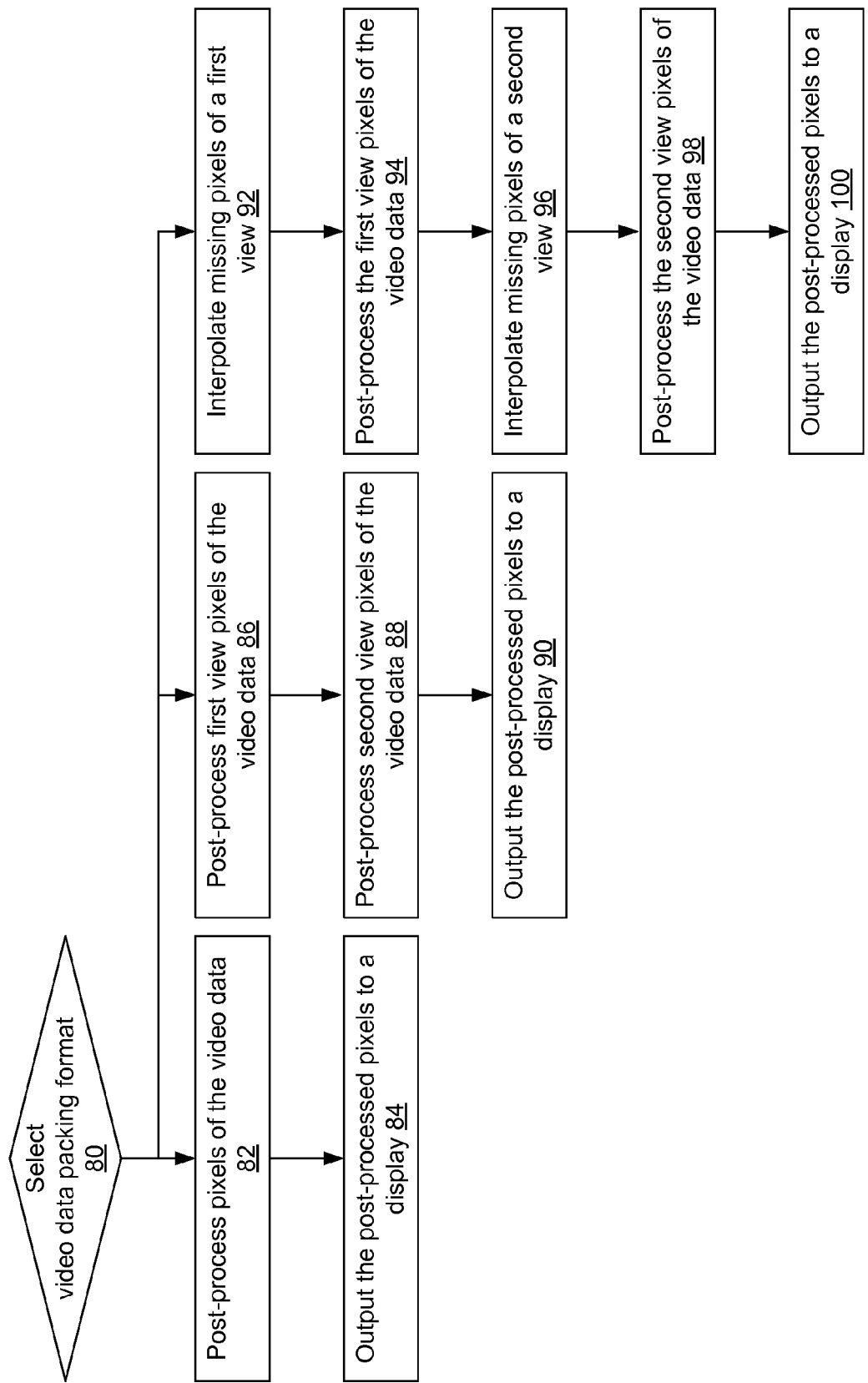
FIG. 4 illustrates a flow chart of the present invention for processing 3D video data according to its respective video data packing format.

FIG. 4 illustrates a flow chart of the present invention for processing 3D video data according to its respective video data packing format. Typically, post-processing can be performed as a function of the video data packing format. The data packing format can be known during the decoding of the 3D video data. Thus, upon post-processing that known format can be used to select the video data packing format for post-processing. For instance, if the data packing format is two-dimensional video data format, then there is a single view to be post-processed. The view of the video data can be post-processed 82 for enhancements. The post-processed view can then be outputted to a display 84 for viewing.

If the video data packing format for post-processing is a row interlace 3D video data format or a column interlace 3D video format, then a first view of the video data is post-processed 86, and then a second view of the video data is post processed 88. The post-processed views are outputted to a display 90 for viewing.

During post-processing of the row interlace 3D video data format, line buffers can be used to store the first view pixels and the second view pixels for post-processing. In a row interlace 3D video format, the odd number rows of the line buffers can be the first view pixels (e.g., right view pixels) and the even number rows of the line buffers can be the second view pixels (e.g., left view pixels). During post-processing, the rows of the line buffers having the first view pixels can be post-processed for enhancements, while the rows of the line buffers having the second view pixels can be skipped until the respective system is ready to post-process the second view pixels. When the second view pixels are ready to be post-processed, the rows of the line buffers having the second view pixels can be post-processed for enhancements, while the rows of the line buffers having the first view pixels can be skipped. Once post-processing has been applied to the pixels of the first view and the pixels of the second view, then the post-processed pixels are outputted to the display.

During post-processing of the column interlace 3D video data format, line buffers can be used to store the first view pixels and the second view pixels for post-processing. In a column interlace 3D video format, the odd number columns of the line buffers can be the first view pixels (e.g., right view pixels) and the even number columns of the line buffers can be the second view pixels (e.g., left view pixels). During post-processing, the columns of the line buffers having the first view can be post-processed for enhancements, while the columns of the line buffers having the second view can be skipped until the respective system is ready to post-process the second view pixels. When the second view pixels are ready to be post-processed, the columns of the line buffers having the second view pixels can be post-processed for enhancements, while the columns of the line buffers having the first view pixels can be skipped. Once post-processing has been applied to the pixels of the first view and the pixels of the second view, then the post-processed pixels are outputted to the display.

If the video data packing format for post-processing is a checkerboard 3D video data format, then the line buffers used in post-processing can have the first view pixels and the second view pixels in the same rows and columns. Missing pixels of the first view pixels can be interpolated for positions in the line buffers that have the second view 92. Post-processing can be applied for the first view pixels in the line buffers and the interpolated first view pixels 94. Missing pixels of the second view pixels can then be interpolated for positions in the line buffers that have the first view 96. Post-processing can be applied for the second view pixels in the line buffers and the interpolated second view pixels 94. Lastly, the post-processed view pixels can be outputted to the display 100.

Figure 5:
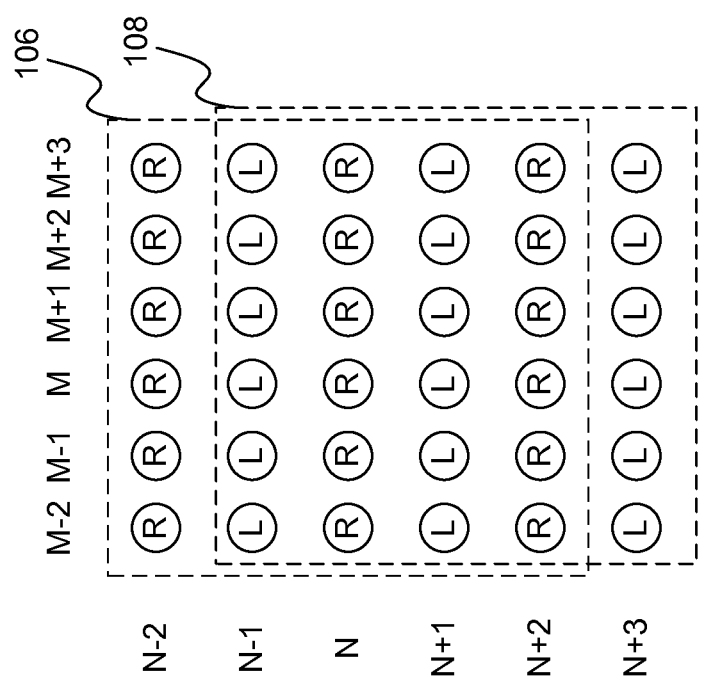
FIG. 5 illustrates left view pixels and right view pixels stored in line buffers of the present invention in a row interlaced video data packing format.

FIG. 5 illustrates left view pixels and right view pixels stored in line buffers of the present invention in a row interlaced video data packing format. Line buffers for post-processing of the present invention can comprise rows of right view pixels (rows N−2, N, and N+2) and left view pixels (rows N−1 and N+1). Post-processing can be applied for a window 106 as detailed above. Once processing is finished for a center row (N), a next row (row N+3) can be inputted to the line buffers for further post-processing a new center row (N+1) as detailed above. Here, a new window 108 can be processed for output to the display. The pixels can be outputted to the display in a raster scan mode.

Figure 6:
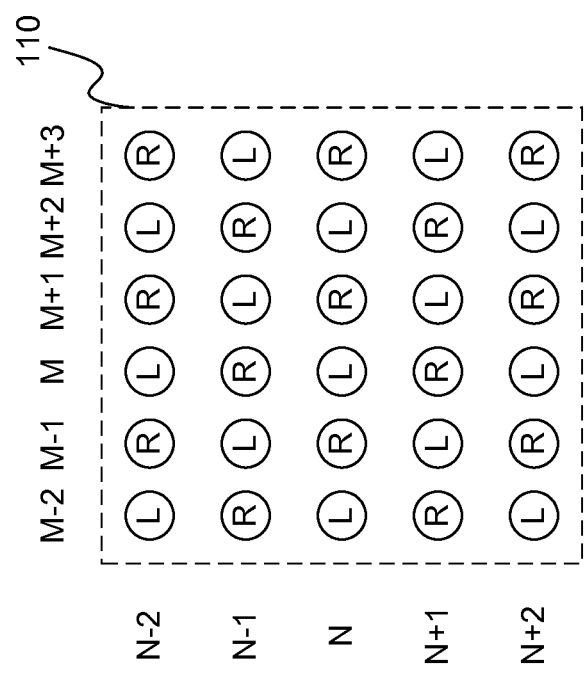
FIG. 6 illustrates left view pixels and right view pixels stored in line buffers of the present invention in a checkerboard video data packing format.

FIG. 6 illustrates left view pixels and right view pixels stored in line buffers of the present invention in a checkerboard video data packing format. Line buffers for post-processing of the present invention can comprise rows (row N−2 to row N+2) and columns (column M−2 to column M+3) having alternating pixels of a left view and a right view. Post-processing can be applied for a window 110 as detailed above. Once processing is finished, then the post-processed pixels (N,M) can be outputs to the display. The post-processed pixels can be sent to the display in an order of L(N,M), R(N, M+1), etc. Normally, the data can be placed in the same format as the display for viewing two views. The post-processing can be applied on the multiplexed 3D video.

While the present invention has been described with reference to certain preferred embodiments or methods, it is to be understood that the present invention is not limited to such specific embodiments or methods. Rather, it is the inventor's contention that the invention be understood and construed in its broadest meaning as reflected by the following claims. Thus, these claims are to be understood as incorporating not only the preferred apparatuses, methods, and systems described herein, but all those other and further alterations and modifications as would be apparent to those of ordinary skilled in the art.

We claim:

1. A method for processing video data, comprising the steps of:
    decoding a stream of the video data;
    post-processing the decoded stream as a function of a video data packing format, wherein the decoded stream having first view pixels and second view pixels and wherein the first view pixels and the second view pixels are stored in line buffers according to the video data packing format; and
    outputting the post-processed stream to a display, wherein the line buffers output the first view pixels and the second view pixels to the display in a displayable format,
    wherein the video data packing format is a three dimensional video row interlace format,
    wherein the line buffers having a first set of rows for the first view pixels and a second set of rows for the second view pixels, and
    wherein the line buffers alternate rows between the first set of rows and the second set of rows.

2. The method of claim 1 wherein the first set of rows of the line buffers for the first view pixels are post-processed, wherein the second set of rows of the line buffers for the second view pixels are post-processed, and wherein the post-processed first view pixels and the post-processed second view pixels are outputted to the display.

3. The method of claim 1 wherein the displayable format is a raster scan.

4. A method for processing video data, comprising the steps of:
    decoding a stream of the video data;
    post-processing the decoded stream as a function of a video data packing format, wherein the decoded stream having first view pixels and second view pixels and wherein the first view pixels and the second view pixels are stored in line buffers according to the video data packing format; and
    outputting the post-processed stream to a display, wherein the line buffers output the first view pixels and the second view pixels to the display in a displayable format,
    wherein the video data packing format is a three dimensional video checkerboard format, and
    wherein the first view pixels and the second view pixels are interlaced in the line buffers in a checkerboard format.

5. The method of claim 4 wherein missing first view pixels are interpolated for the first view pixels in the line buffers, wherein the interpolated missing first view pixels and the first view pixels are post-processed, wherein missing second view pixels are interpolated for the second view pixels in the line buffers, and wherein the interpolated missing second view pixels and the second view pixels are post-processed.

6. The method of claim 4 wherein the displayable format is a raster scan.

7. A method for processing video data, comprising the steps of:
    decoding a stream of the video data;
    post-processing the decoded stream as a function of a video data packing format, wherein the decoded stream having first view pixels and second view pixels and wherein the first view pixels and the second view pixels are stored in line buffers according to the video data packing format; and
    outputting the post-processed stream to a display, wherein the line buffers output the first view pixels and the second view pixels to the display in a displayable format,
    wherein the video data packing format is a three dimensional video column interlace format,
    wherein the line buffers having a first set of columns for the first view pixels and a second set of columns for the second view pixels, and
    wherein the line buffers alternate columns between the first set of rows and the second set of rows.

8. The method of claim 7 wherein the first set of columns of the line buffers for the first view pixels are post-processed, wherein the second set of columns of the line buffers for the second view pixels are post-processed, and wherein the post-processed first view pixels and the post-processed second view pixels are outputted to the display.

9. The method of claim 7 wherein the displayable format is a raster scan.

* * * * *